March 4, 1952  W. A. SLENESS  2,587,658
FISHING PLUG

Filed March 14, 1949  2 SHEETS—SHEET 1

WALLACE A. SLENESS
Inventor

By Arnold and Mathis
Attorney

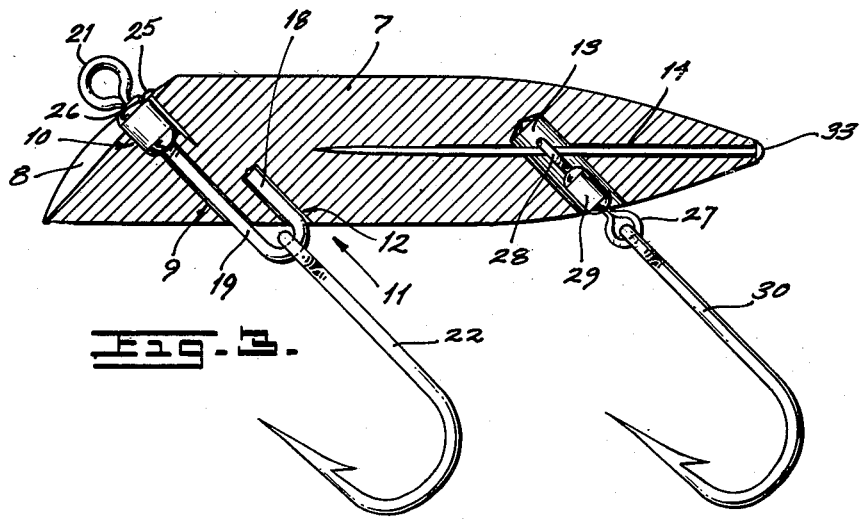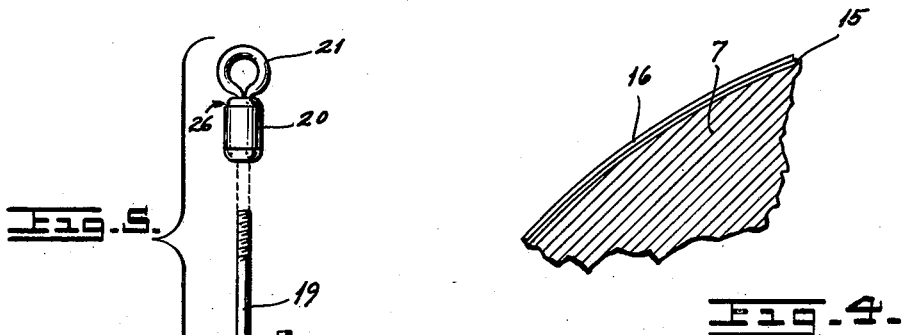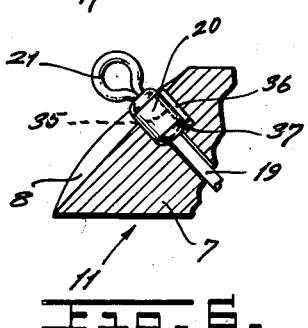

Patented Mar. 4, 1952

2,587,658

UNITED STATES PATENT OFFICE 2,587,658

FISHING PLUG

Wallace A. Sieness, Seattle, Wash.

Application March 14, 1949, Serial No. 81,331.

2 Claims. (Cl. 43—42.08)

This invention relates to artificial fish bait or lures and more particularly to that type of lure which is generally termed in the art as a trolling plug.

A particular feature of this invention is the manner in which the hooks are secured to the body proper and which give the plug an action in water which has brought about unusual results.

Another object of the invention is to provide a particular manner of securing the forward hook to the plug body to provide for economy of construction, positiveness of result, and an improved plug body action.

Another object of the invention is to provide a particular way of securing a ferrule of a swivel so that the ferrule body is held immovable even though the plug is subjected to the damaging effects of the elements as well as the violent spinning action of the swivel.

Another object of the invention is to provide a means of securing the trailing hook and associate swivel to the plug body to insure ease of manufacture, positiveness of result, and to provide a more desirable action of the plug body when in use.

Another object of the invention is to provide a construction whereby the parts can be coated with a preservative covering and whereby the finished product will withstand damage by reason of the elements and by a fish's teeth.

The above mentioned general objects of my invention, together with others inherent in the same, are attained by devices illustrated in the accompanying drawings throughout which like reference numerals indicate like parts.

Fig. 3 is a sectional view with parts shown in elevation taken substantially on broken line 3—3 of Fig. 2 and further showing a different type of hook which may be employed;

Fig. 4 is an enlarged fragmentary sectional view of the plug body to illustrate the external protective covering;

Fig. 5 is an exploded view in elevation showing the leader eye, the connecting swivel, and the U pin forming the belly eye of the completed plug; and Fig. 6 is a fragmentary sectional view showing a modified form of connecting swivel which may be employed in connection with the leader eye.

Figure 1:
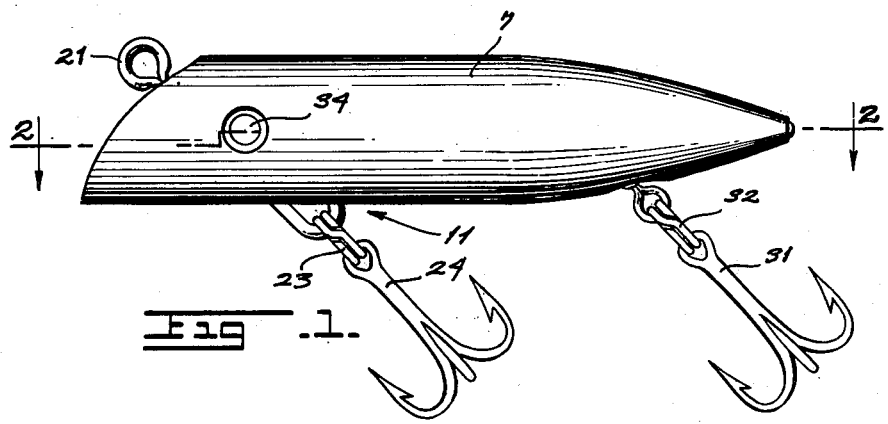
Figure 1 is a view in side elevation of a device embodying my invention.
Figure 2:
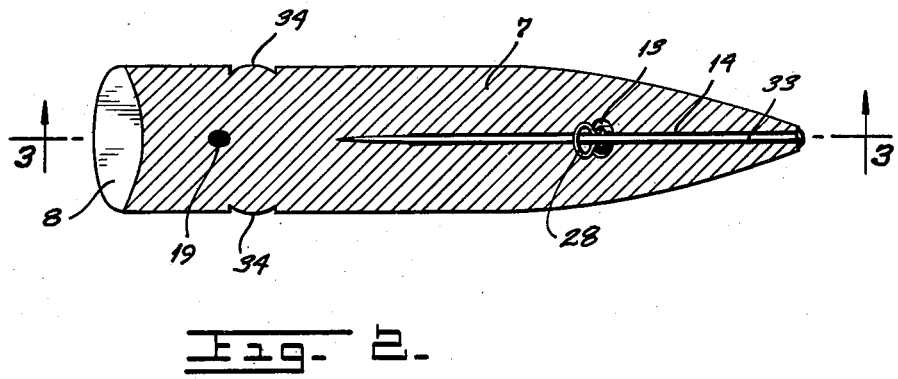
Fig. 2 is a sectional view with a swivel for the trailing hook, the securing means for said swivel, and the nose of the plug body shown in elevation, said view being taken substantially on broken line 2—2 of Fig. 1.

In the drawings, a plug body 7 is illustrated and such plug body may be of various sizes and contour but I have found that the form shown is preferable and it provides, in combination with the parts of my invention, the most desirable action of the plug body when it is being towed or drawn through the water. The plug body 7 has a concave nose portion 8 and a drilled recess 9 having an enlarged portion 10. The recess 9 and enlarged portion 10 extend from the nose 8 to the bottom portion 11 of the plug 7 at an angle of approximately 45° to the bottom portion 11. Another recess 12 is provided and such recess 12 is parallel to the recess 9. Toward the trailing end of the plug, a recess 13 is provided and said recess 13 is drilled and the same is preferably parallel to the recesses 9 and 12. A recess 14 is provided and said recess 14 is preferably axially, longitudinally aligned with the plug body 7.

In manufacturing my plug, first the plug body, as just described, is provided. Then a waterproof coating, as a resinous covering 15 (see Fig. 4), is applied to cover and preferably to impregnate the external surface portion of the fish plug body as well as coating and impregnating the surface portions about the recesses 9, 10, 12, 13 and 14.

In this connection, it is important to note that plug lures are often used in salt water fishing and hence protection against the elements is a factor of vital importance. Even if the plugs are used in fresh water fishing, as for muskellunge or pike, damage, by reason of moisture contacting uncovered wood, is generally present. A hard resinous external surface also provides protection against the plug being chewed or marred by the teeth of fish.

A preferred method of waterproofing the plug body 7 is to first warm the plug body to a temperature of about 150° F. Then the plugs are immersed in a resin sealer contained within a pressure cooker. Heat is applied until a pressure of approximately 50 lbs. is obtained and the plugs are treated for approximately 30 minutes. This permits a resin sealer to enter in to the fibre structure of a wood plug and impregnate the surface portion (i. e. the surface and slightly therebelow) of the plug with a resin sealer. Also the sealer enters in to and impregnates the walls providing the recesses 9, 10, 12, 13 and 14. After treating the plugs for the desired period, then the plugs are removed and the sealer is permitted to set or cure. Obviously the temperature and time employed will depend on the nature, character, and formation of the resin sealer employed.

The type of hardware which I have employed permits the entire fish body and all surfaces, by reason of recesses, to be first waterproofed before assembling the plug and this is of prime importance in my invention.

After the plug body 7 has had the waterproof coating 15 applied, then it is painted and decorated to provide surface 16. The surface 16 will comprise a plurality of coats in order to get desired decorative effects for lure purposes. For example, the nose 8 is generally red and the body portion 7 seldom comprises only one color. The plug of my invention is first machined or formed from suitable material, such as wood, and then the plug is completed in its entirety before the hardware is added. This has resulted in plugs of extremely long life and particularly of long life against variations which would tend to effect the action of the plug while it is being towed in the water.

While various methods may be employed to provide eyes 34, I preferably indent the wood before waterproofing and then hand decorate to provide eyes during the painting stage. This provides for durable and permanent eyes.

After the plug is completed, as just described, then the hardware is applied. One piece of the hardware comprises a U pin, numbered generally 17 in Fig. 5, which has a short leg 18 and a longer leg 19. The longer leg 19 is threaded at its end to threadedly engage the barrel 20 of a swivel. The barrel 20 cooperates with the leader eye 21 so that the leader eye 21 may swivel or freely rotate as respects the barrel 20. The U portion of the pin 17 and the body forms therebetween a belly eye on which may be secured a hook, such as the hook 22 shown in Fig. 3 or a hook and split ring 23 and 24 shown in Fig. 1. While a hook eye may be directly connected to the U pin 17 (the eye is open for insertion and thereafter closed), some fishermen desire to employ the split ring 23 for ease in changing hooks. Obviously, the split ring 23 can be employed either in connection with a hook of the type as indicated by the hook 24 or of the type indicated by the hook 22 or other types of hooks.

After a hook eye has been inserted over one of the legs 18 or 19 of the U pin 17 and permitted to move to the base of the U, then the legs 18 and 19 may be inserted respectively in the recesses 12 and 9 and then the barrel 20 is threaded over the threaded portion of the leg 19. When the parts are firmly secured in place, then a locking pin 25 is inserted into the body portion 7 while the head thereof is aligned with a recess 26 in the barrel 20. By engagement between the head of the pin 25 and the recess 26, the barrel 20 is fixed against rotary motion. Also the barrel 20 may have a recess 35 (see Fig. 6) and a locking key 36 may register in said recess and in a recess 37 in the body 7.

Also the U pin 17 may have the legs 18 and 19 inserted in the openings 12 and 9 before a hook is secured in place. Hooks of the type, as indicated by 22, generally are provided with an open eye so that they can be mounted on a belly eye by sliding the same in place and then bending the eye to a closed position. Also if split rings, as split ring 23, are employed, they can be readily mounted on a closed belly eye.

The swivel for trailing hook, comprising eyes 27 and 28 and barrel 29, can be readily inserted in place in the opening 13. Again, the trailing or aft hook, as hook 30, or hook and split ring 31 and 32, may be first mounted on the eye 27 before insertion of the swivel 27, 28 and 29 or mounted after the swivel is mounted in place as described in connection with the forward hook construction. After the eye 28 is in place, then a pin 33 is passed through the opening 14, threaded through the eye 28 and driven in to the plug body 7. As will appear from Fig. 3 of the drawings, the pin 33 is longer than the recesses 14 which permits a substantial portion of the pin 14 to be driven in to the plug body 7 so as to permanently secure the pin 33 in place. I have found that sufficient waterproofing material and paint will be present if the procedure previously outlined is followed so that the exces will automatically form a seal about the pin 33 if the pin 33 is driven in place within a reasonable time after the waterproofing and painting of the plug body 7. Due to the restricted size of the opening 14, waterproofing material and paint, which enters the same, do not tend to readily dry and I take advantage of this to provide sealing means between the pin 33 and new or bare wood into which it is driven.

From the foregoing, it will be apparent that I have provided a plug body 7 which is tubular in form and tapers toward the tail thereof. The nose 8 is concave and is inclined at an angle of approximately 45° to the tubular body portion. The plug body 7 is drilled to provide the passageways 9, 12, 13 and 14. Next, preferably the plug body 7 is indented with an appropriate tool to define the eye portions 34. Next, the plug body 7 and the various recesses are impregnated with a waterproofing solution as by boiling under pressure. Thereafter, the waterproofing is cured or permitted to set. Then the plug body 7 is suitably decorated and is ready to have the hardware attached. By the above procedure, the plug body 7 is completely waterproofed and may be maintained waterproofed as the hardware can be readily, conveniently, and simply attached in accordance with my invention without impairing the watertight integrity of the plug. The U-pin 17 is inserted from the bottom side 11 of the plug body 7 until the short leg 18 engages the end of the recess 12 and the threaded portion of the long leg 19 enters the enlarged or countersunk portion 10. Then the barrel 20 is rotated and threadedly interconnected with the long leg 19. Then the pin 33 or the key 36 may be employed to fix the barrel 20 against rotation and secure the U-pin 17 in place. The recess portion 10 is preferably located about two-thirds up the nose portion 8 to get the most desired action of the plug body while it is being towed. Also swivel 27—28—29 may be readily inserted in the opening 13 and then the pin 33 is passed through recess 14, through eye 28, and is driven in to the plug body 7 and sealed in place by partially cured sealer present in the opening or recess 14.

In the construction illustrated and defined, the leader eye 21 may be attached directly to the leader line and thus the leader line will be attached closely adjacent the plug body 7 so that the fulcrum point between the leader line and the plug body 7 is relatively close to the plug body which allows maximum freedom of the plug and also about a point relatively close to the plug body 7.

Obviously, changes may be made in the forms dimensions, and arrangements of the parts of my invention without departing from the principle thereof, the above setting forth only preferred forms of embodiment.

I claim:

1. A fishing plug comprising an elongated body having an inclined nose portion and having a plurality of recesses in said body, said recesses comprising a first tubular recess extending from said nose portion angularly downwardly toward and to the underside of said body, and a second and shorter tubular recess extending from the underside of said body inwardly of and terminating within said body, said first and second recesses being substantially parallel; a U-shaped pin having a threaded long leg, and a substantially parallel short leg, the long leg being positioned in said first tubular recess, the short leg being positioned in said second tubular recess, and the loop of said U-shaped pin being positioned external of the body at the belly side and functioning as fish hook engaging means; leader eye means threadedly engaged with said long leg and positioned against an upper portion of said body and urging said short leg longitudinally in said second tubular recess and against a portion of said body; and locking means preventing rotary movement of said leader eye means on said long leg and engaging said leader eye means and said body.

2. A fishing plug comprising an elongated body having an inclined nose portion and having a plurality of recesses in said body, said recesses comprising a first tubular recess extending from said nose portion angularly downwardly toward and to the underside of said body, and a second and shorter tubular recess extending from the underside of said body inwardly of and terminating within said body, said first and second recesses being substantially parallel; a U-shaped pin having a threaded long leg, and a substantially parallel short leg, the long leg being positioned in said first tubular recess, the short leg being positioned in said second tubular recess, and the loop of said U-shaped pin being positioned external of the body at the belly side and functioning as fish hook engaging means; leader eye means threadedly engaged with said long leg and positioned against the upper portion of said body and urging said short leg longitudinally in said second tubular recess and against a portion of said body, said leader eye means being provided with a pin receiving recess in an edge portion thereof; and locking means preventing rotary movement of said leader eye means on said long leg and engaging said leader eye means and said body, said locking means comprising a pin engaging said body and said pin receiving recess in said leader eye means.

WALLACE A. SLENESS.

REFERENCES CITED

The following references are of record in the file of this patent:

UNITED STATES PATENTS

| Number | Name | Date |
|---|---|---|
| 356,661 | Pfaff | Jan. 25, 1887 |
| 1,254,397 | Dickens | Jan. 22, 1918 |
| 1,489,043 | Reinewald | Apr. 1, 1924 |
| 1,842,591 | Dunkelberger | Jan. 26, 1932 |
| 2,134,330 | Fink | Oct. 25, 1938 |
| 2,187,475 | Lauby | Jan. 16, 1940 |
| 2,202,519 | Ferris | May 28, 1940 |
| 2,241,767 | Cullerton | May 13, 1941 |